United States Patent [19]
St. Clair et al.

[11] 3,840,866
[45] Oct. 8, 1974

[54] METER READING

[75] Inventors: Theodore A. St. Clair, Fairfield; Richard K. Weltz, Southbury, both of Conn.

[73] Assignee: Textron Inc., Providence, R.I.

[22] Filed: Feb. 8, 1973

[21] Appl. No.: 330,748

[52] U.S. Cl. ...... 340/188 R, 340/177 VZ, 340/204, 340/357
[51] Int. Cl. .......................................... G08c 19/28
[58] Field of Search............... 340/188 R, 204, 19 B, 340/177 VZ, 357, 365 L

[56] References Cited
UNITED STATES PATENTS

| | | | |
|---|---|---|---|
| 3,266,018 | 8/1966 | Higgins | 340/357 |
| 3,441,923 | 4/1969 | King | 340/188 R |
| 3,461,384 | 8/1969 | Bayate | 340/190 |
| 3,651,917 | 3/1972 | Kondur | 340/365 L |
| 3,685,041 | 8/1972 | Kondur | 340/357 |
| 3,721,969 | 3/1973 | Stewart | 340/204 |

Primary Examiner—Thomas B. Habecker
Attorney, Agent, or Firm—Arthur A. Johnson

[57] ABSTRACT

There is disclosed apparatus for reading a meter, located in a building or other enclosure out of sight from the exterior of the building, by bringing a portable unit, which may be carried by meter reading personnel, into proximity with a fixed unit which is accessible from the exterior of the building, the fixed unit being connected to and responsive to an encoder register mounted on the meter, the communication between the fixed unit and the portable unit being solely by radiant energy, the fixed unit and the portable unit each having radiant energy emitting means and radiant energy receiving means, radiant energy emissions from the fixed unit transmitting binary coded decimal signals to the receiving means in the portable unit, and the radiant energy emissions from the portable unit transmitting decimal order selection signals to the receiving means in the fixed unit.

7 Claims, 7 Drawing Figures

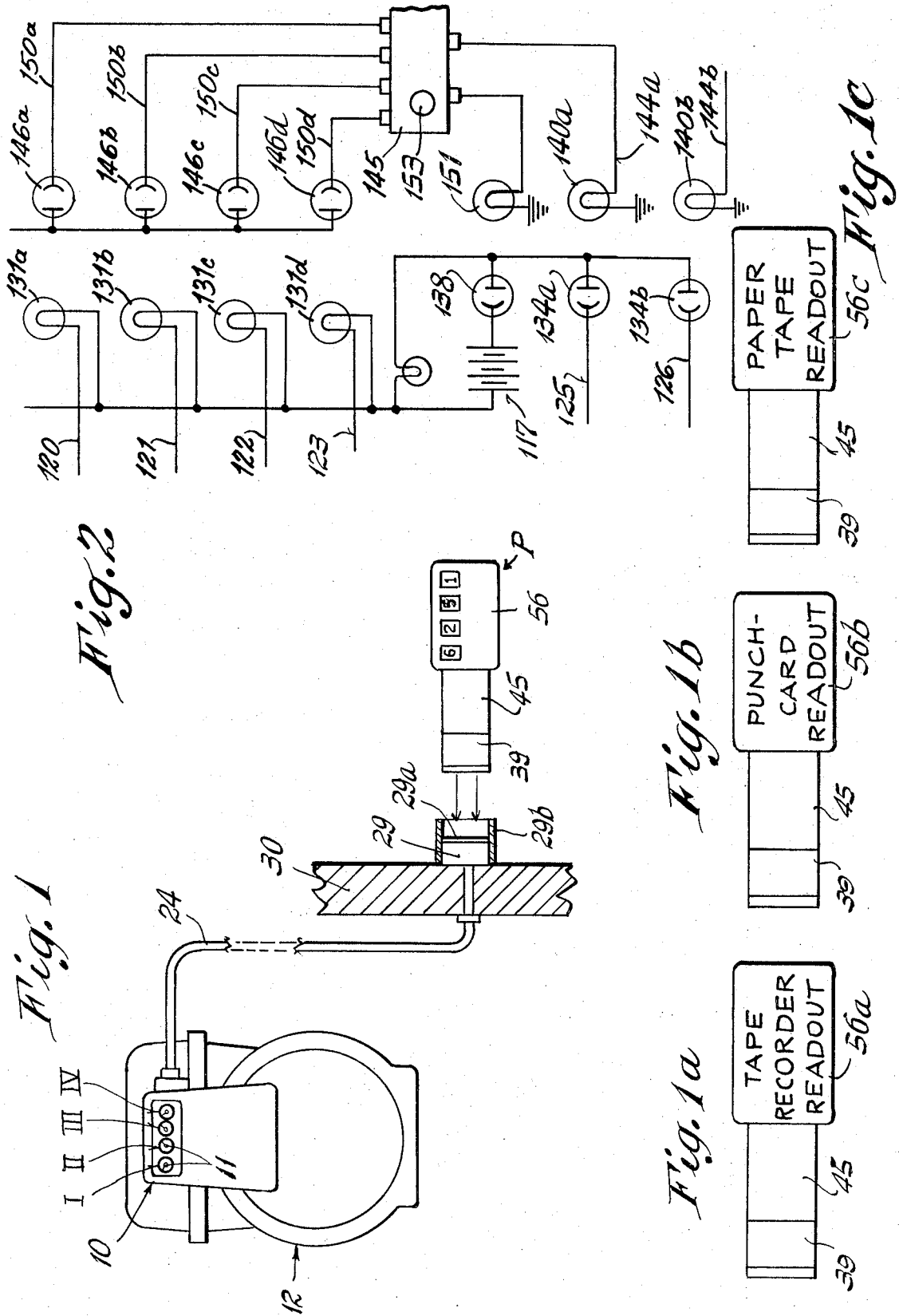

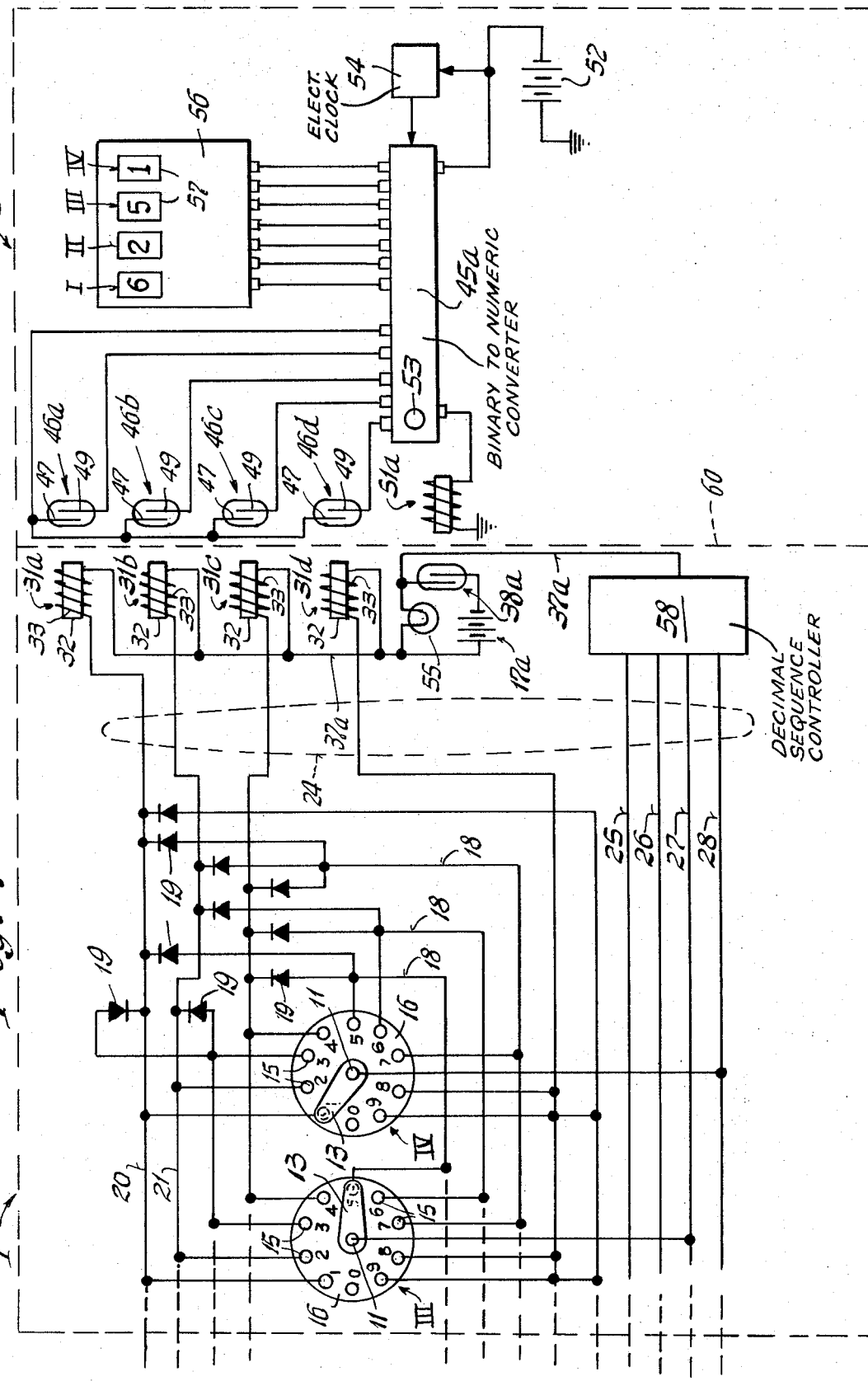

METER READING

This invention relates to apparatus for reading meters, such as gas, water or electric meters which are located in a building or other enclosure where they cannot be read from the exterior of the building and constitutes a substantial improvement over such devices heretofore proposed.

An object of this invention is to provide improved apparatus for facilitating the reading of a meter, such as a gas meter, a water meter or an electric meter which is located in enclosures, such as a building, and out of sight from the exterior of the building.

It has long been a problem for public utilities, such as gas, water and electric companies, to read meters, especially those installed in dwellings and other private places due to the fact that frequently meter reading employees of utilities are unable to gain access to the meter in the premises because of the absence of the occupants of the dwelling or because of the reluctance of many occupants, especially women, to allow strangers to enter the premises for any purpose. When these conditions prevail, the meter reader must return, sometimes several times, to read the meter or he may leave a card requesting the occupant to read the meter, fill out the card and mail it to the office of the utility. In either event the costs to utilities in reading the meter are substantial and this is reflected in the service charge made to the user.

Means for reading meters at remote places have been heretofore suggested and used. But of these many have been installed on the exterior of the dwelling where they are noticeable and can be sight read by any passerby. Besides, they frequently detract from the appearance of the dwelling.

Other proposed remote reading means require the making of electrical and mechanical connections between fixed and portable units, for instanace by plug and socket devices, which may be tampered with and are liable to become dirty and corroded.

In other arrangements it was proposed that the readout of the meter be transmitted by wire to a central office for reading, for instance over utility or telephone wires, but the cost of such equipment and the transmission charges made such method prohibitively costly.

These and other disadvantages and objections to the previously proposed devices have been obviated by the present invention by providing a fixed emitter and receiver of radiant energy on the exterior of the building, whose purposes and use are not obvious to the passerby, and a portable receiver and emitter of radiant energy having means to display, transmit or record the reading of the meter from the exterior of the building.

In the broader aspects of this invention the radiant energy emitter and receiver may be of various sorts, such as for instance heat, light—visible or invisible—, vibrations, sound—inaudible or audible— or magnetism, especially electromagnetism, the latter being presently considered preferable.

Another advantageous feature of this invention is that, although the device of the present invention provides electrical means for reading the meter from the outside of the building, there are no exposed physical electrical connections or contacts to corrode or otherwise be damaged.

Further, with apparatus now in use for the purpose stated, using external display means, when it is necessary to exchange meters or to disconnect them for testing their accuracy, which is periodically required in many localities, it is necessary to synchronize the external reader with the new or checked meter which involves the expenditure of considerable time and labor. With the apparatus of the present invention, synchronizing of the meter with the readout apparatus is not necessary. It is merely necessary to bring the portable unit into proximity with the fixed unit.

Another feature of this invention is that the output of the unit receiving the signals may be communicated to a remote place, such as the central office of a utility company, by telephone or power lines without making any physical electrical connection between the meter and such lines.

According to the present invention the coupling between the fixed and portable units may comprise a plurality of electromagnets and a plurality of companion magnetic reed switches for each unit, both of which may be cancealed and hermetically sealed in their respective unit enclosures. It is merely necessary to place the portable unit against the fixed unit in order to read the meter from the outside of the building. The readouts of the portable unit may be conventionally displayed or they may be recorded on a tape or punched cards carried by or connected to the portable unit.

Other features and advantages of the invention will hereinafter appear.

In the accompanying drawings:

FIG. 1 is a schematic view showing a fixed unit comprising an encoder connected to the meter and electrically connected to the receiver and transmitter of radiant energy mounted in a casing attached to the exterior of the building and a portable unit having a casing containing a transmitter-receiver of radiant energy and including a logic circuit and electric clock connected to a decimal readout.

FIG. 1a is a block design of a tape recorder readout.

FIG. 1b is a block design of a punch-card readout.

FIG. 1c is a block design of a paper tape readout.

FIG. 2 is a diagrammatic view showing parts of the circuits of the fixed and portable units shown in FIG. 3 in which the radiant energy emitted and received is light, the emitter being a source of light and the receiver being a photocell, the elements corresponding to those in FIG. 3 being identified by the use of the same reference numbers prefixed by the numeral "1".

FIG. 4 is a diagrammatic view like FIG. 3, but showing a modified form of the present invention.

Figure 3:
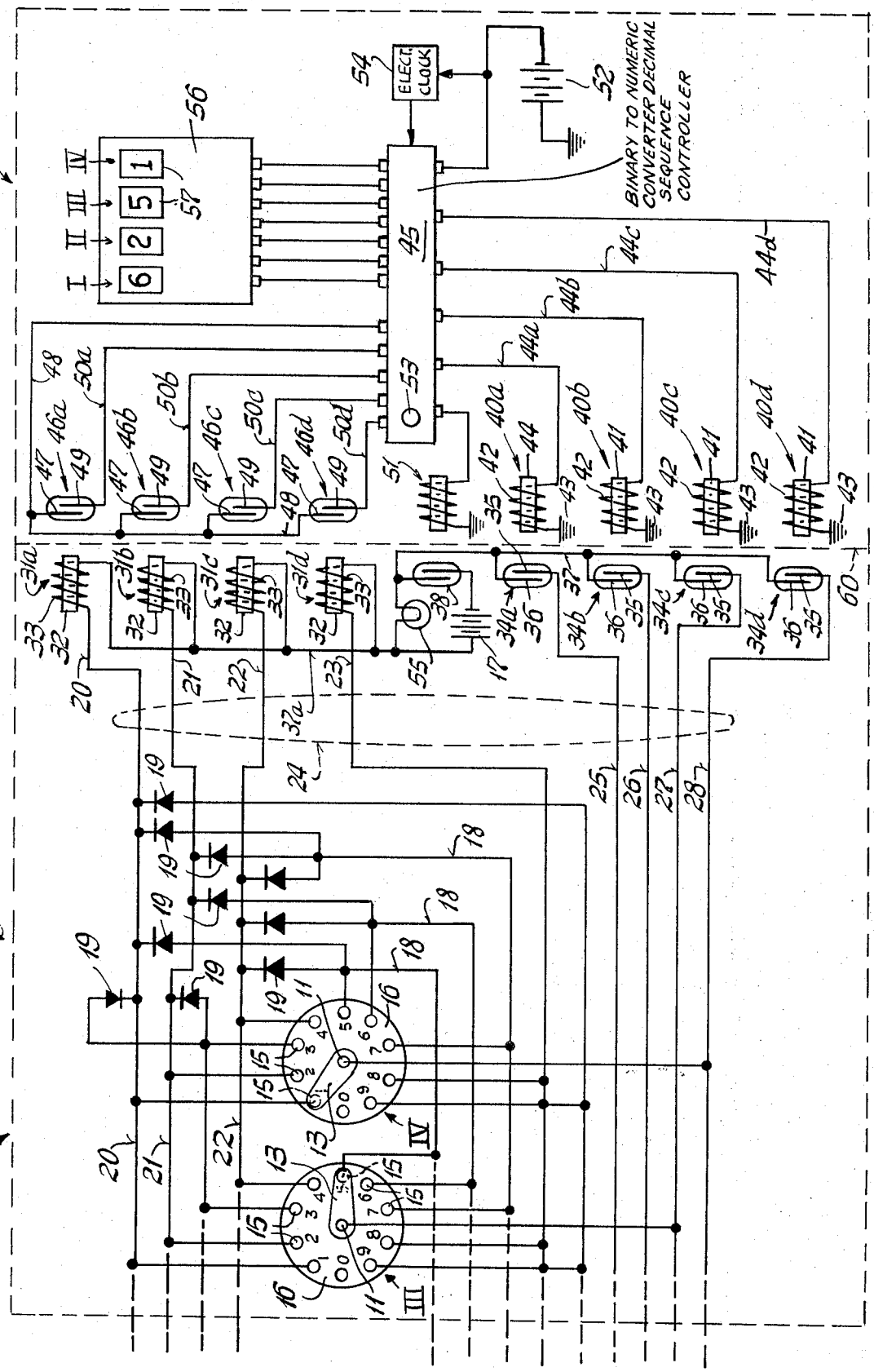
FIG. 3 is a diagrammatic view of the apparatus of the present invention showing the components of the fixed and portable units in juxtaposed positions, the first two significant dials of the binary coded decimal encoder being omitted.

As used herein the expression "radiant energy" is intended to embrace any energy traversing space between an emitter and a responder.

As shown in the accompanying drawings, the form of the apparatus of the invention at present preferred comprises a data rotary encoder 10 which is connected to the index mechanism of a meter 12, represented by shafts 11 of dials I, II, III and IV, which may be those of a gas, water, electric or similar meter. Any suitable encoder 10 may be used for the purpose of this invention. A diagrammatic view of one suitable decimal to binary encoder is shown in FIG. 3 in which a wiper contact 13 connected to each index shaft 11 engages contacts 15, one contact for each of the numerals from 0 to 9 on an index dial 16. When energized by a battery 17 (FIG. 3) current is fed to one of the wiper contacts 13 and by the latter to a numeral contact 15 on its associated dial I, II, III or IV with which the wiper happens to be then engaged. Through lines 18 and diodes 19 connected to the contacts 15, currents is fed to binary coded output lines 20, 21, 22 and 23 which may form part of a cable 24, lines 20, 21, 22 and 23 representing the binary numbers 1, 2, 4 and 8, respectively.

When, as is the situation assumed in FIG. 3, there are four register dials, sometimes called index dials, on the encoder (only dials III and IV being shown in FIG. 3) the wiper contacts 13 of the respective denominational dials are connected to individual leads 25, 26, 27 and 28 which may be included in the cable 24.

As illustrated in FIG. 1, the cable 24 leads to a casing 29 of the fixed unit F which may be mounted on a suitable support 30 on the exterior of the building within which the meter to read is located.

Supported by and concealed within the casing 29 of the fixed unit F there are, in the form of the invention illustrated in FIG. 3, spaced electromagnets 31a, 31b, 31c and 31d, each having a core 32 and a winding 33 wound in such direction that the core 32 has a determinate polarity directed towards the cover 29a over the surface of the casing 29 and hermetically closing and sealing the casing 29. The windings 33 of the electromagnets 31a, 31b, 31c and 31d are connected respectively to the leads 20, 21, 22 and 23 inclusive as indicated in FIG. 3.

Also supported in the casing 29 of the fixed unit F are reed switches 34a, 34b, 34c and 34d, each having a blade 35 connected respectively to one of the denominational leads 25, 26, 27 and 28, and another blade 36 connected to a common return lead 37 connected by a reed switch 38 to the battery 17.

A portable unit P comprises a casing 39 which may be carried by meter reading personnel to the location of the casing 29 connected to the meter to be read and placed adjacent the casing 29 in predetermined alignment therewith which may be accomplished by sliding the casing 39 into a guide portion 29b of the casing 29 designed to fit the casing 39.

The casing 39 contains electromagnets 40a, 40b, 40c and 40d, each having a core 41 and a winding 42. One end of each winding 42 is connected to a common ground 43 on the casing 39, and the other ends are connected separately by leads 44a, 44b, 44c and 44d to a logic circuit 45.

The portable unit P also comprises reed switches 46a, 46b, 46c and 46d, each of which has a reed 47 connected to a common return wire 48 and another reed 49 connected by wires 50a, 50b, 50c and 50d to the logic circuit 45.

The reed switches 46a, 46b, 46c and 46d are arranged preferably in a row, but are spaced from each other in position to substantially align with the electromagnets 31a, 31b, 31c and 31d in the casing 29 of the fixed unit F, when the casing 39 of the portable unit P is properly placed against the casing 29 of the fixed unit F. When one of the electromagnets 31a, 31b, 31c or 31d is energized. the radiant thereof, i.e., the magnetic field, will cause the blades 47 and 49 of its associated reed switches 46a, 46b, 46c or 46d to engage and thus close a circuit including the leads 50a, 50b, 50c or 50d of the logic circuit 45.

It will be recalled that the electromagnets 31a, 31b, 31c and 31d are connected to the binary circuits controlled by the positions of the wiper blades 13 relative to the numeral contacts 15 of the index dials as shown in FIG. 3. The electromagnets 40a, 40b, 40c and 40d in the casing 39 of the portable unit P are also in spaced relation in positions to substantially align with the reed switches 34a, 34b, 34c and 34d in the casing 29. When the casing 39 is properly placed against the casing 29 so that when one of the electromagnets 40a, 40b, 40c or 40d is energized by the logic circuit 45, its magnetic field will cause the blades 35 and 36 of its associated reed switch 34a, 34b, 34c or 34d to engage and thus close a dial-selecting circuit including one of the wires 25, 26, 27 and 28 and battery 17.

One of the features of the present invention is the provision of means whereby no current flows through the fixed unit F except when a reading of the meter is being taken. This effects substantial savings in the battery power since the fixed unit F is used very seldom, usually about once a month. Not only is this a saving of electric current but it also reduces the deterioration due to corrosion, friction and arcing of the contacts 15 on the index mechanism and the wiper dial 13.

Normally there is no current flowing from the encoder 10 to the electromagnets 31a, 31b, 31c and 31d; however, when a reading is to be made, the fixed unit F may be made electrically active by operation of the portable unit P.

For this purpose the fixed unit F is provided with a reed switch 38 which opens and closes a circuit to the battery 17. The portable unit P is provided with an electromagnet 51 positioned to align with the reed switch 38, and the logic circuit 45 is provided with a source of current 52. Thus, when a cycle-start switch 53 in the logic circuit 45 is operated, the electromagnet 51 is energized and its magnetic field causes the blades of the reed switch 38 to engage and connect the battery 17 to the return lead 37 for the reed switches 34a, 34b, 34c and 34d in the fixed unit, and the return lead 37a for the electromagnets 31a, 31b, 31c and 31d in the fixed unit F.

When this occurs, the logic circuit 45, which is synchronized by electric clock 54, energizes one of the electromagnets 40a, 40b, 40c or 40d (the electromagnet 40d in the example given) which closes the denominational control switch 34d in the fixed unit F and thus completes a circuit including wire 28, wiper contact 13 and contact 15 standing for the number "1" on the IV dial, assuming the reading is from lower to higher denomination. The contact 15 is connected by binary "1" line 20 to electromagnet 31a, the magnetic field of which causes the reed switch 46a to close and transmit a signal to the logic circuit 45 through line 50a. The logic circuit sends a signal to readout device 56 which causes all the decimal displays 57 to shift and count to show 1—1—1—1 in the example given, after which the display 57 of the readout IV is locked in its "1" display condition.

After this occurs, the logic circuit 45 under control of the electric clock 54 energizes the electromagnet 40c in the portable unit P which closes the switch 34c in the fixed unit F and this completes a circuit including the lead 27, wiper 13 and contact 15 for the numeral "5" contact on the III dial which is connected to the binary "4" lead 22 and the binary "1" lead 20. The lead 22 energizes the electromagnet 31c in the fixed unit F and its electromagnetic field causes the reed switch 46c to close and through the logic circuit 45 and lead 50c to send four pulses through the leads 50c and 46c to the III display device and the lead 20 energizes the electromagnet 31a which closes the switch 46a which closes a circuit leading to the logic circuit 45 which sends one pulse to the display 57 of the III readout. The displays I, II and III are then shifted to show 5—5—5-1, the displays III and IV being locked with the numerals "5" and "1" displayed. The logic circuit 45 and the electric clock continue to shift the circuit to dial II and then dial I causing the displays of the readout to first display the numeral 2—2—5—1 and then 6—2—5—1.

After the dials have been read and displayed on the readout, the electromagnet 51 is deenergized thus opening the battery circuit prolonging the life of the battery.

In order to be assured that the battery 17 has sufficient charge, means are provided by the present invention to indicate the battery has sufficient power. The form of the invention showing this means comprises a lamp 55 located so that its glow may be seen when the start-cycle switch 53 is operated.

While the embodiment of this invention above described is concerned with communicating the reading of the meter to a point outside the building in which the meter is located, the feature of having the fixed and portable units electrically isolated from each other may advantageously be employed for transmitting the reading of the meter over greater distances by telephone and other utility lines.

This method of communication could be dangerous if the encoder circuit were directly connected to a source of current, but with the appparatus of the present invention no direct metal-to-metal electrical contact need be made between the two separate units.

For the aforesaid purpose, the fixed and portable units may be permanently held together in juxtaposition and instead of feeding the output of the logic circuit to a nearby readout, the pulses emitted from the logic circuit may be transmitted over telephone and other utility lines with the denominational control feeding the output of the logic circuit to the service lines in carrier waves of different frequencies.

As stated above, radiant energy other than magnetism may be employed according to the present invention. For instance, as shown in FIG. 2, light may be used as a source of radiant energy, the light sources 131a, 131b, 131c and 131d being connected respectively to the leads 120, 121, 122 and 123 which are the binary "1," "2," "4" and "8" leads of the encoder, while the photocell 146d is connected by the lead 150d to the logic circuit 145. The light source 151 is connected to the logic circuit 145 and is energized by the starter button 153.

In the denominational control circuit of the modification shown in FIG. 2, the sources of light 140a and 140b are connected respectively to leads 144a and 144b and to ground, while the companion photocells 134a and 134b are connected respectively to leads 125 and 126 connected to the wiper contacts of the first and second dials, not shown.

In this form of the invention, the cover plates for the adjacent sides of the fixed and portable units are transparent in the areas covered by the beams of light from the light emitters.

As shown in FIG. 4 in one aspect of this invention which could be preferable, if the cost of the apparatus above described becomes a factor in adopting its use, the apparatus may be simplified by retaining the emitters 31a, 31b, 31c and 31d in the fixed unit, but omitting the energy emitters 40a, 40b, 40c and 40d and the receivers 34a, 34b, 34c and 34d from the portable unit, and substituting for these a logic circuit capable of energizing the denominational control leads 25, 26, 27 and 28 in succession, for instance from highest order dial I to lowest order dial IV or the reverse.

The radiant energy emitter 51a which is connected to the logic circuit means 45a of the portable unit and the reed switch 38a and battery 17a are retained, and the common return 37a is connected to a logic circuit 58, the output of which is connected to the leads 25, 26, 27, 28 leading to the wiper contacts 13 respectively of the dials IV, III, II and I.

When the starter switch 53 is closed, the electromagnet 51a is energized and the reed switch 38a is closed; the logic circuit 58 connects the leads 25, 26, 27 and 28 seriatim to the battery 17a to energize the wiper contacts 13 of the dials 16.

As shown in FIG. 1a, FIG. 1b and FIG. 1c, the readout may comprise a tape recorder readout 56a (FIG. 1a), a punch-card readout 56b (FIG. 1b) or paper tape readout 56c (FIG. 1c).

The dash lines 60 indicate the physical separation of the fixed and portable units.

Variations and modifications may be made within the scope of the claims and portions of the improvements may be used without others.

We claim:

1. Apparatus for remotely reading a meter register comprising two separate and separable units, one of said units being a fixed unit mounted on a fixed support and including an encoder connected to the meter register and including a binary coded decimal circuit common to each of the significant denominational elements of said register, a plurality of spaced energy emitting means mounted on said fixed unit and connected to said binary circuits; the second of said units being portable and comprising a portable support, a plurality of spaced energy responsive means mounted on said portable support and positioned so that the respective energy emitting means are in substantial alignment with companion energy responsive means when said units and their supports are juxtaposed, a binary to numeric converter means including a source of current on said portable support connected to said energy responsive means thereon, and readout means on said portable support controlled by said converter means, said energy emitting means and energy responsive means on the fixed and portable supports respectively being physically isolated from each other, a source of current on said fixed unit, and means, including means on the portable support and cooperating means on the fixed support, for connecting said source of current on said fixed unit to said denominational elements on said fixed support seriatim.

2. Apparatus for remotely reading a meter according to claim 1 in which said energy emitting means comprises a plurality of spaced magnetic flux emitting means and said energy responsive means comprises a plurality of spaced means responsive to the magnetic flux of said energy emitting means, one said emitting means being provided for each of said responsive means.

3. Apparatus for remotely reading a meter according to claim 1 in which said energy emitting means are electromagnets and said energy responsive means are reed switches.

4. Apparatus for remotely reading a meter according to claim 1 in which said fixed support is fixed to the exterior of a building in which the meter is located and said portable unit may be manually carried and positioned adjacent the fixed unit without making electric contact therewith.

5. Apparatus for remotely reading a meter according to claim 1 in which the energy emitting means and the energy responsive means on the fixed unit are concealed from view and covered against tactile engagement.

6. Apparatus for remotely reading a meter according to claim 1 in which said means for connecting said source of current to said denominational elements seriatim includes a plurality of energy emitting means on said portable support and connected to said converter means, and a plurality of energy responsive means on said fixed support and connected to said source of current, each of said last-named energy responsive means being connected to a companion one of said denominational elements in substantial alignment with said last-named energy emitting means when said fixed support and portable support are juxtaposed.

7. Apparatus for remotely reading a meter according to claim 1 in which said means on the portable support and cooperating means on the fixed support for connecting said source of current on said fixed unit to said denominational elements on said fixed support seriatim includes energy emitting means on said portable support and energy responsive means on said fixed support.

* * * * *

UNITED STATES PATENT OFFICE
CERTIFICATE OF CORRECTION

Patent No. 3,840,866      Dated October 8, 1974

Inventor(s) Theodore A. St.Clair and Richard K. Weltz

It is certified that error appears in the above-identified patent and that said Letters Patent are hereby corrected as shown below:

In column 3, line 10, "currents" should read --current--;
             line 66, insert --energy-- after "radiant".
In column 4, line 1, "switches" should read --switch--.

In column 3, line 66, after "energized" change the "." to a -- , --.

Signed and sealed this 7th day of January 1975.

(SEAL)
Attest:

McCOY M. GIBSON JR.
Attesting Officer

C. MARSHALL DANN
Commissioner of Patents